United States Patent [19]
Lee, II

[11] Patent Number: 5,505,229
[45] Date of Patent: Apr. 9, 1996

[54] FLUID RESISTOR

[75] Inventor: Leighton Lee, II, Guilford, Conn.

[73] Assignee: The Lee Company, Westbrook, Conn.

[21] Appl. No.: 90,500

[22] Filed: Jul. 12, 1993

[51] Int. Cl.$^6$ ..................................................... F15D 1/02
[52] U.S. Cl. ................... 138/40; 138/44; 138/45
[58] Field of Search .................... 138/40, 42, 43, 138/89, 37, 44, 45

[56] References Cited

U.S. PATENT DOCUMENTS

| | | | |
|---|---|---|---|
| 2,728,355 | 12/1955 | Dahl | 138/45 |
| 2,893,432 | 7/1959 | Gibson | 138/42 |
| 3,072,261 | 1/1963 | Smith | 138/42 X |
| 3,323,550 | 6/1967 | Lee, II | 138/39 |
| 3,427,002 | 2/1969 | Wilding | 138/42 X |
| 4,294,289 | 10/1981 | Fischer | 138/44 |
| 5,027,861 | 7/1991 | Gute | 138/43 X |
| 5,160,226 | 11/1992 | Lee, II | 411/72 |

*Primary Examiner*—David Scherbel
*Assistant Examiner*—Patrick F. Brinson
*Attorney, Agent, or Firm*—Philip J. Lee

[57] ABSTRACT

A fluid resistor for providing resistance to flow through a flow passageway is formed by cutting channels and open cylindrical recesses on the surface of and flow passage bores through a frusta-conical body to be seated in a tapered passageway section with the larger diameter end generally subject to higher system pressures than the smaller diameter end. The seating of the resistor body in a tapered passageway section seals and encloses the channels and recesses which then with the fluid passageways through the resistor body, comprise a restricted path for flow to proceed past the installed resistor, the recesses forming cylindrical chambers. Each chamber is tangentially by a channel and connected to another chamber by a bore that is coaxial to both chambers, the direction of the tangential intersection relative to the coaxial bore alternating, each upstream chamber inducing a spin that must be decelerated before the fluid exits the immediately downstream chamber, any even number of chambers being used as space and desired performance may require.

16 Claims, 7 Drawing Sheets

FLUID RESISTOR

BACKGROUND OF THE INVENTION

A. Field of Invention

The present invention relates generally to devices for providing resistance to flow and more particularly to a new and improved fluid resistor for installation within a bore and economically providing resistance to flow of fluid through the bore.

B. Description of Related Art

Known devices used for providing resistance to the flow of a fluid media, in their simplest form, frequently control the flow by simply restricting the internal diameter of an orifice. Severe reduction of an orifice causes a fluid resistor to become subject to significant changes in resistance in response to changes in the viscosity of the fluid media, as well as to contamination and to cavitation. For these reasons, it has been found to be important to maximize the orifice size for a given resistance by increasing the ratio of the resistance offered by the device to the cross-sectional area of the orifice. One method of increasing the ratio of resistance to orifice size is to increase the exposure of the fluid media to the internal surface area of the flow passage or device, thereby increasing the friction experienced by the flow. Multiple parallel orifice resistors such as screens or filters, by increasing the surface area exposed to flow, provide resistance with a relatively large total flow passageway area, but the individual orifices are small, leaving such devices susceptible to blockage by contamination. Arranging multiple resistors in series allows each individual orifice to have a greater internal diameter than a single orifice restrictor but such arrangements can be bulky and costly. A fluid restrictor which overcomes some of the performance limitations that arise from using either a single orifice restrictor, or a multiple orifice arrangement is shown in U.S. Pat. No. 3,323,550, issued to Lee, wherein there is described a fluid resistor constructed of a series of plates aligned normal to the overall direction of the flow forming a tortuous flow path. In the Lee device the fluid media first enters at the center of a first chamber from which flow exits through a passageway that is perpendicular to the overall flow path and tangential to the first chamber and to a second spin chamber which the fluid media then enters. The fluid media exits the second spin chamber by a coaxial bore that has a smaller internal diameter than the second spin chamber. The spinning fluid is forced to move radially inward and as it does so, the rotational velocity is accelerated until the fluid exits through the coaxial bore into a deceleration chamber from which it exits by a tangential passageway. The tangential velocity of the fluid within the coaxial bore maximizes the effectiveness of the bore in resisting passage of the fluid. The tangential passageways into and from the second spin chamber and the deceleration chamber extend in opposing directions so that the spin of the fluid media must be dissipated before the fluid exits the deceleration chamber. The output of a deceleration chamber of a spin chamber/deceleration chamber pair may serve as the input into the spin chamber of a subsequent pair, and the number of pairs so connected may be varied to achieve the desired amount of fluid resistance. In the Lee device the coaxial bores are all drilled in a single disc that is normal to the axis of the resistor and therefore, the direction of flow through the bores is repeatedly reversed. The primary benefit of the Lee device is the ability to provide fluid resistance with a minimal reduction of internal diameter of the smallest orifice, thereby reducing the likelihood of blockage and allowing filtration by protective screens to be either eliminated or relaxed allowing larger passages through the filtering screens. It has been shown that increasing the interior diameter of the smallest orifice of a fluid resistor will substantially increase the average useful life of the flow resistor in most circumstances where clogging, or cavitation damage, is the primary cause of failure. The Lee device provides such a fluid resistor with increased diameter orifice in a form requiring manufacture by forming a series of disks which are subsequently bonded together to complete and seal the internal flow passage way. This method of manufacture is more costly than simpler although less efficient devices. The laminated discs are housed within a body that is sturdy enough to endure the rigors of installation. Since the repeated pairs of opposing spin and deceleration chambers are arranged in the plane normal to the axis of the general flow passage, the total diameter of the body and the installation bore is relatively large with respect to the amount of resistance provided by the device. Although the ratio of the resistance to the diameter of the orifice at its most narrow point in the Lee device is lower than that of simple resistors, the ratio of the overall bore diameter to the orifice is large due to the bulk of the resistor discs and body. In addition, the installation method of the Lee resistor requires the precise reaming of an installation bore and minor variations in tooling or reaming technique can produce clearances between the outside surface of the plug and the inside surface of the installation bore that are significant to the retention and sealing of the resistor.

SUMMARY OF THE INVENTION

The invention herein described is a new and improved fluid resistor having a resistor body that is formed from one piece and has an axially tapered outside surface forming a frusta-conical bore engaging surface. In most applications, a pressure drop is expected across the resistor and the end normally exposed to higher system pressure has a larger diameter than the end normally exposed to lower system pressures. An installation bore into which the resistor of the instant invention is to be inserted is first reamed or formed to provide approximately the same taper angle as the bore engaging surface of the resistor body. As the resistor is inserted into the installation bore, the parallel opposing surfaces of the resistor body and installation bore are moved into snug engagement. Due to the taper of the installation bore, a shoulder within the installation bore is not required to limit the axial movement of the resistor body in response to the forces exerted during installation and operation. Since both the installation bore and the body are tapered, inaccuracies in the inside diameter of the installation bore are more easily tolerated than in other similarly installed resistors. Due to the matched taper angles of the resistor body and the installation bore, variations between the outside diameter of the resistor and the inside diameter of the installation bore result in variations in the depth to which the resistor is inserted rather than resulting in a clearance or interference between the bore engaging surface of the resistor and the inner surface of the installation bore. In the resistor of the present invention, radial expansion is not required to bridge the clearance between the resistor and the installation bore as the resistor is self-aligning and will find the seating angle that provides the best seal. The taper angle of the resistor body is kept within a self-locking range to provide significant retentive friction between the installation bore wall and the outer surface of the resistor body. A taper angle of 4.3° has been found to be optimal for allowing ease of insertion and seating while adequately sealing and retaining the resistor within the installation bore, The resistor is more able to resist displacement by the force imposed by pressure of the fluid on the inlet end than by the force on the outlet end and this fact is to be considered during installation. In the event higher retentive capability is desired, for example if high back pressures or bidirectional flow are anticipated, reduction of the taper angle will cause greater frictional retention.

A restrictive flow passage is provided through the installation bore and past the installed resistor by means of channels, chambers and bores formed by cutting and drilling or by molding the solid resistor body. Assembly of separate parts is not required as the resistor body is one piece. The restrictive flow passage is defined in part by the resistor body and in part by the inner wall of the installation bore. When the resistor is installed, the installation bore sealingly engages those parts of the outer surface of the resistor body that have not been cut away or drilled and the inner wall of the installation bore completes the definition of the flow passage that allows flow past the installed resistor and provides the desired fluid resistance. The fluid media enters the restrictive flow passage by means of an inlet channel cut into the outer surface of the resistor body. The inlet channel tangentially intersects a cylindrical spin chamber, the axis of which is perpendicular to the axis of the resistor body, thereby imparting a spin to the fluid media. The fluid media thus is caused to spin in a plane approximately parallel to the axis of the resistor body and normal to the axis of the spin chamber. The fluid then exits the spin chamber through a central, coaxial bore leading to second cylindrical chamber on the opposite side of the resistor. As the spinning fluid media moves radially inward, the rotational velocity is accelerated until the fluid exits the spin chamber. The high tangential velocity of the fluid media entering the coaxial bore maximizes the effectiveness of the bore in resisting passage of the fluid. The second chamber is a mirror image of the spin chamber except that the fluid exits the second chamber through an exit channel cut in the outer surface of the body, and the exit channel tangentially intersects the second chamber in the direction opposite to the direction of the inlet channel. In the deceleration chamber, the residual spin must be dissipated and the fluid must decelerate and reverse its spin prior to exiting through the exit channel. The energy consumed in the deceleration and subsequent re-acceleration reduces the energy of the fluid media thereby achieving the equivalent effect of flow resistance. The spin chamber, the second chamber and the bore connecting the chambers are all mutually coaxial, the common axis being on a plane that is normal to the axis of the resistor body. As may be desired to provide the required resistance, multiple spin chamber/deceleration chamber pairs may be used, preferably in serial fashion to maintain the maximum orifice size and the minimum over all size of the resistor body. Alternatively, flow passages of different configuration could be used although with different results, for example a spiral or threaded passage. Since the body of the resistor uses the inner wall of the installation bore as the outer wall of the flow passageway past the resistor, economical one piece construction is possible using conventional machining or molding methods. The tapered body further allows the body to be self retaining without expansion means or other retentive means. Thus the body may be formed of a wide variety of materials provided they have adequate strength for the intended application.

The principal aim of the present invention is to provide a new and improved fluid resistor which meets the foregoing requirements and which is easily installed without the use of a shoulder in the installation bore.

Another and further object and aim of the present invention is to provide a new and improved resistor which will be economical to manufacture and install and which is capable of use in a small diameter passageway.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 2:
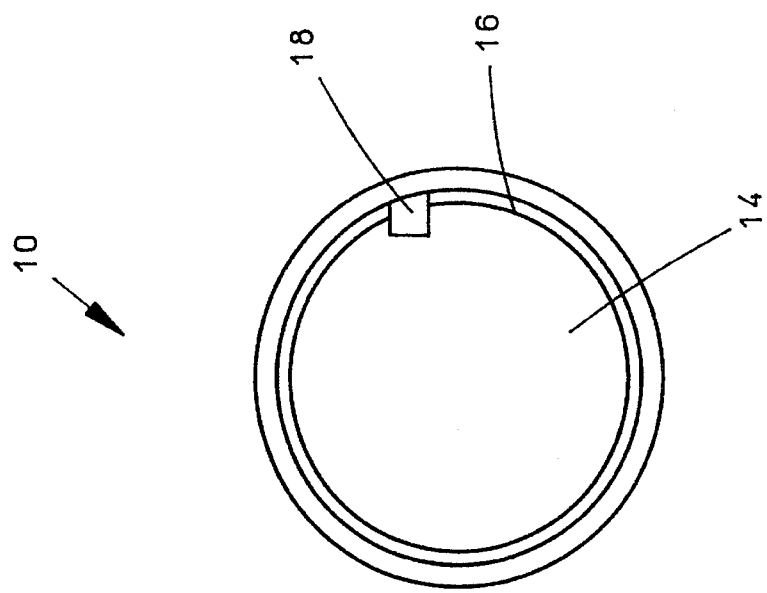
FIG. 2 is a back view of a first preferred embodiment of the invention showing the outlet end of the installed invention.
Figure 1:
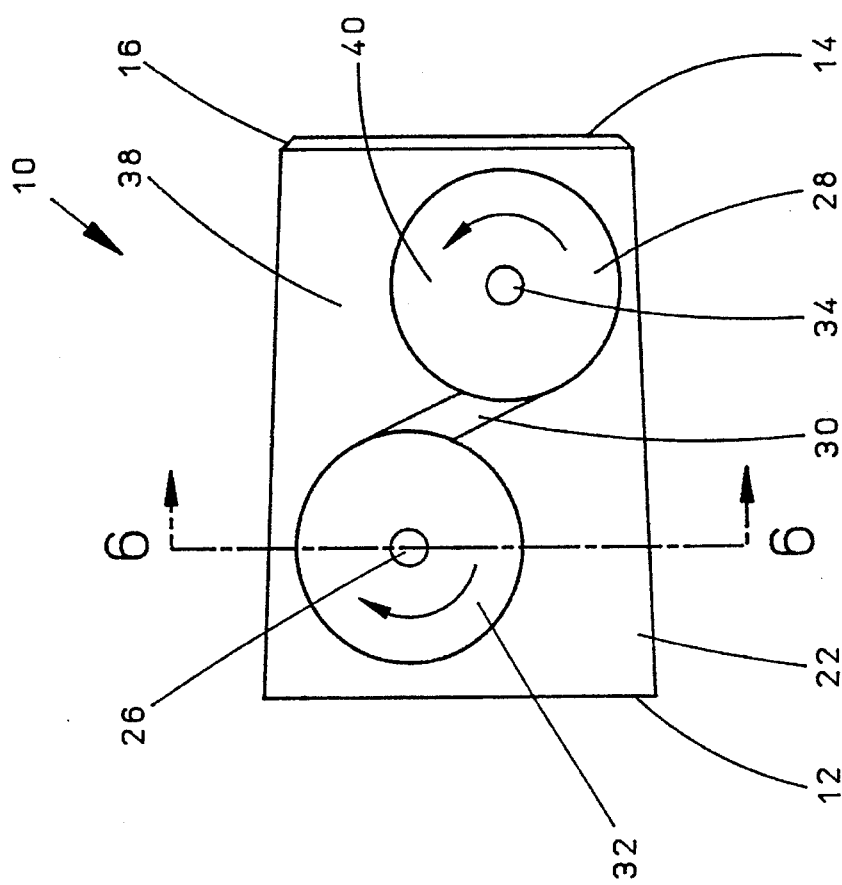
FIG. 1 is a right side view of a first preferred embodiment of the invention.
Figure 7:
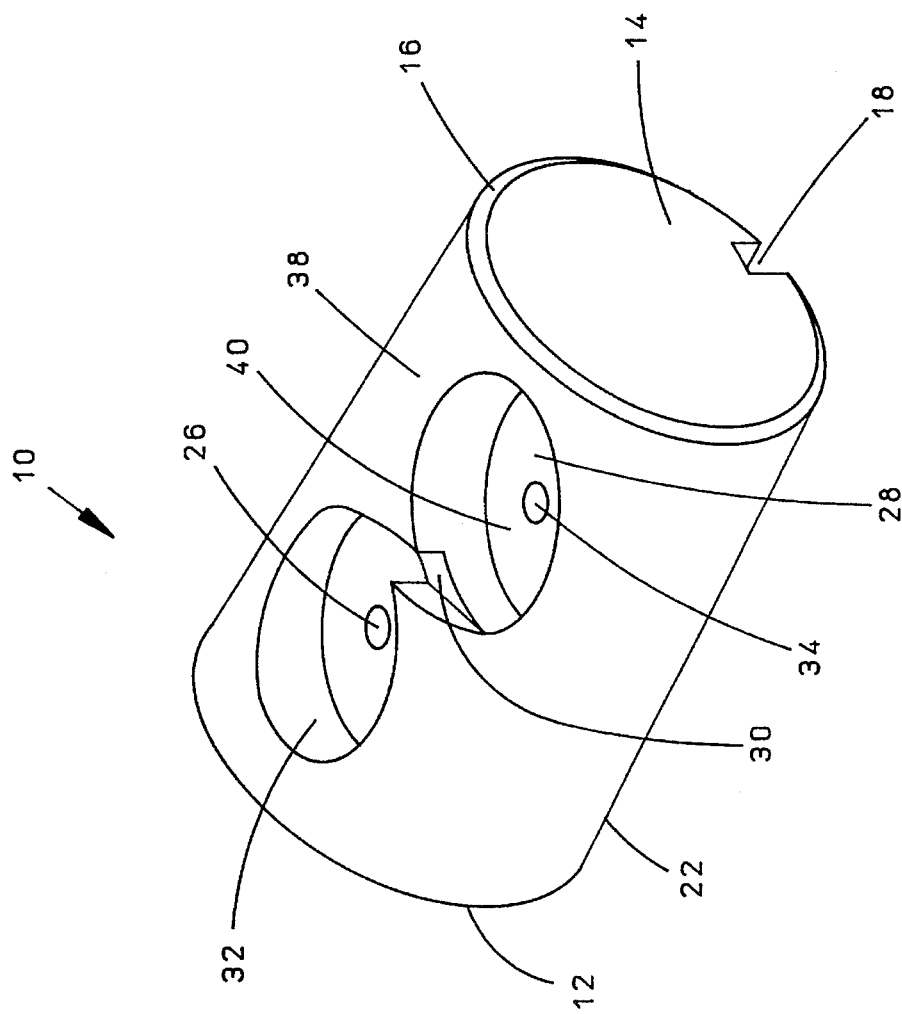
FIG. 7 is an isometric view of a first preferred embodiment of the present invention.

With reference to the drawings wherein like numerals represent like parts throughout the Figures, a fluid resistor in accordance with the present invention is generally designated by numeral 10 in FIG. 1 and a second embodiment of a fluid resistor in accordance with the present invention is generally designated by numeral 50 in FIG. 7. Fluid resistor 10 has a general overall frusta-conical shape having an inlet end 12 and an outlet end 14. Inlet end 12 is of slightly larger diameter than outlet end 14 and generally comprises a circular flat planar surface normal to the axis of the flow passage within which the resistor 10 is installed and to the general direction of flow. In the preferred installation, flow proceeds past Resistor 10 from the inlet end 12 to the outlet end 14. The anticipated use of the resistor 10 is by inserting the same into a fluid passageway in which the inside wall of the fluid passageway has been reamed, molded, cast, forged or otherwise adapted to present an internally tapered surface with an inside diameter and taper angle similar to and corresponding with that of radially outer surface 22 of the fluid restrictor 10. Fluid restrictor 10 is therefore inserted into the tapered installation bore of the fluid passageway such that the outer surface 22 snugly and sealingly engages the inside wall of the installation bore. In the illustrated preferred embodiment, the radially outer edge 16 of outlet end 14 is chamfered at a forty-five degree angle; however, it is anticipated that outlet end 14 may take a variety of forms and edge 16 may alternatively present a rounded or a sharp corner, depending upon the materials used and the method of manufacture. The taper of the outer surface 22 of the resistor 10 has a taper angle such that the tangent of the included angle ("b"), meaning the ratio of the amount by which a larger outside diameter of outer surface 22 ("D'") exceeds a smaller outside diameter of surface 22 ("d'") to the axial distance between the planes of D' and d' ("l'") equals 0.075, ie. Tangent b=(D'−d')/l'=0.075, where "b" is the included angle of taper of outer surface 22, "D'" is the outside diameter of outer surface 22 at a point generally toward resistor inlet end 12, but not including any reduction by intersection with channel 20 as hereinafter described, "d'" is the outside diameter of outer surface 22 at a point between point D' and outlet end 14 but not including the chamfered area of edge 16 or channel 20 or channel 30 as hereinafter described, and "l'" is the axial distance between the planes through D' and d' that are perpendicular to the axis of resistor 10. The taper of 0.075 corresponds to the tangent of the included angle b of approximately 4 degrees 17 minutes. The taper angle of outer surface 22 may be selected from a range of from 1 degree to 7 degrees, however, a taper angle of about 4.3 degrees is believed to be an acceptable and optimum compromise. It is understood that use of taper angles of outer surface 22 that are larger than 7 degrees result in an unjustifiable and undesirable drop off in retentive capability. On the other hand, generally, as the taper angle of outer surface 22 decreases, problems associated with installation increase. For example, when lower angles are used, the radial tolerance between the installation bore and the outer surface 22 become more critical and the resistor 10 tends to migrate farther within the installation bore in an axially inward direction in response to the force of installation. In addition, taper angles in the "Self-holding" range as that term is used by the American National Standard Institute, see definitions in *MACHINERY'S HANDBOOK, 22nd Edition,* by Erik Oberg, Franklin D. Jones, and Holbrook L. Horton, Industrial Press, Inc., 1985, page 1734, the contents of which are incorporated herein by this reference, will provide greater retentive capability. Although a wider range of acceptable angles may be used, the retentive force of friction between the installation bore and the outer surface 22 will decrease as the taper angle increases. It is understood that available taper reamers are more likely to develop a variation in diameter from use, ie., from wear or burrs, than a variation in taper angle. The proper, snug seating of resistor 10 is more dependent on the correspondence of the taper angles of the outer surface 22 and the installation bore than on the respective diameters of said parts since diameter variations, within relatively wide limits, simply cause a variation in the axial position of the installed resistor 10. Thus the probability of a misalignment producing a leak is reduced as the tapered resistor 10 will adjust itself to the taper of the installation bore. In the event of a mismatch of taper angles, a misalignment of the resistor 10 within the installation bore will initially occur until the installation force causes enough axially inward movement of resistor 10 to cause a more close fit.

Figure 4:
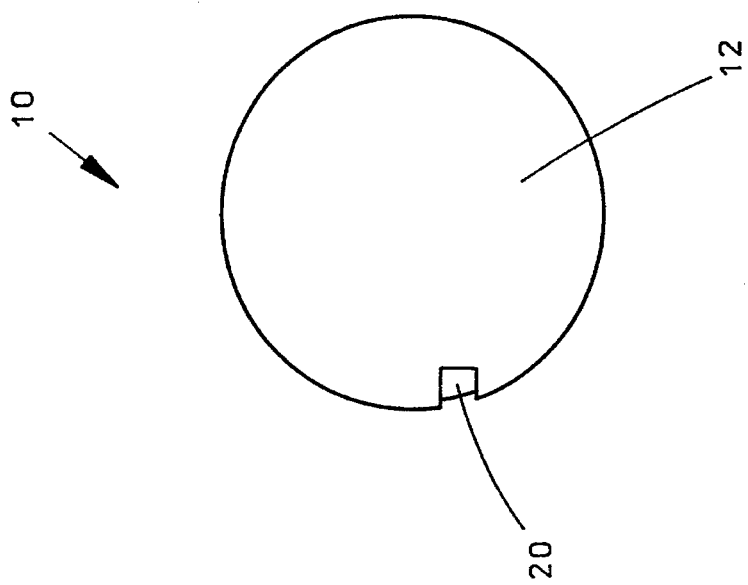
FIG. 4 is a front view of a first preferred embodiment of the invention showing the inlet end of the installed invention.
Figure 3:
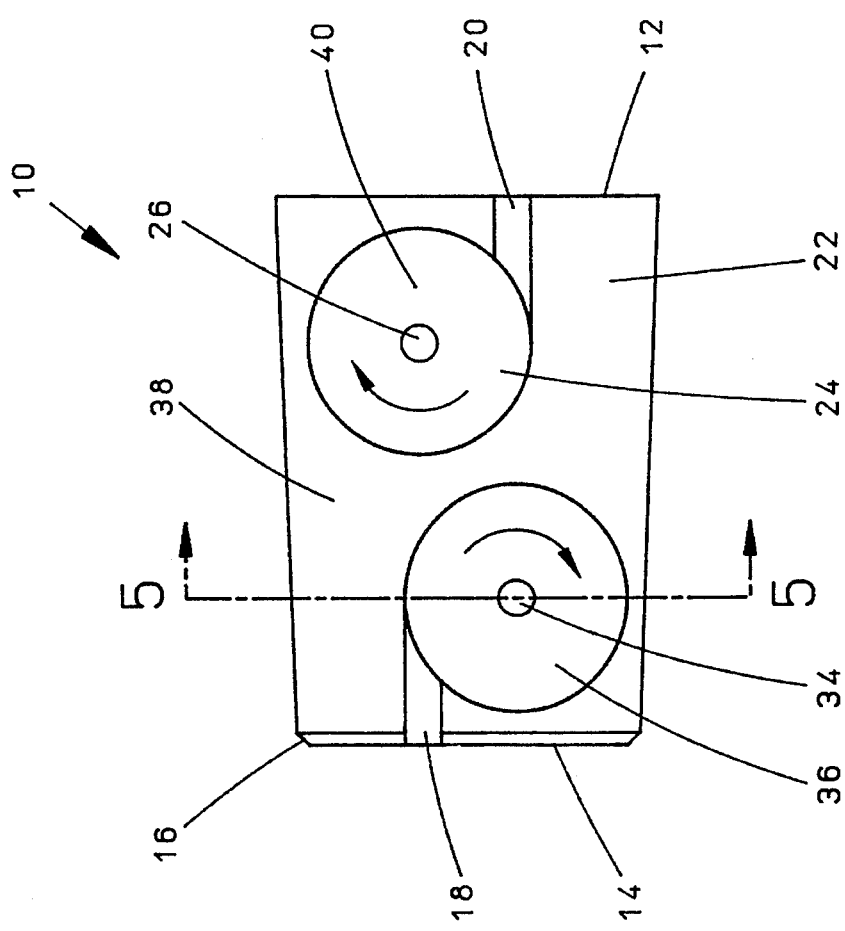
FIG. 3 is a left side view of a first preferred embodiment of the invention.
Figure 6:
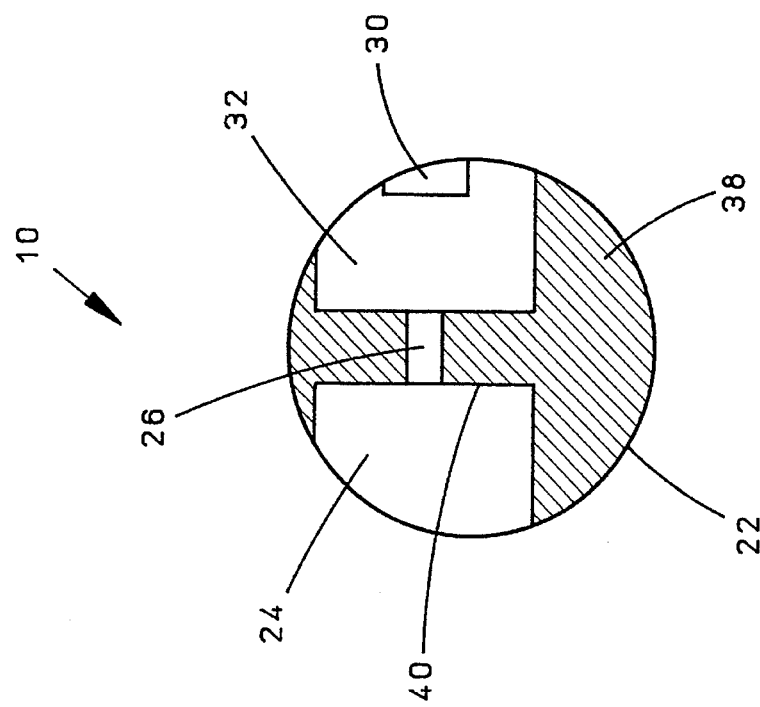
FIG. 6 is a cross sectional view of a first preferred embodiment of the present invention taken along line 6—6 shown in FIG. 1.
Figure 5:
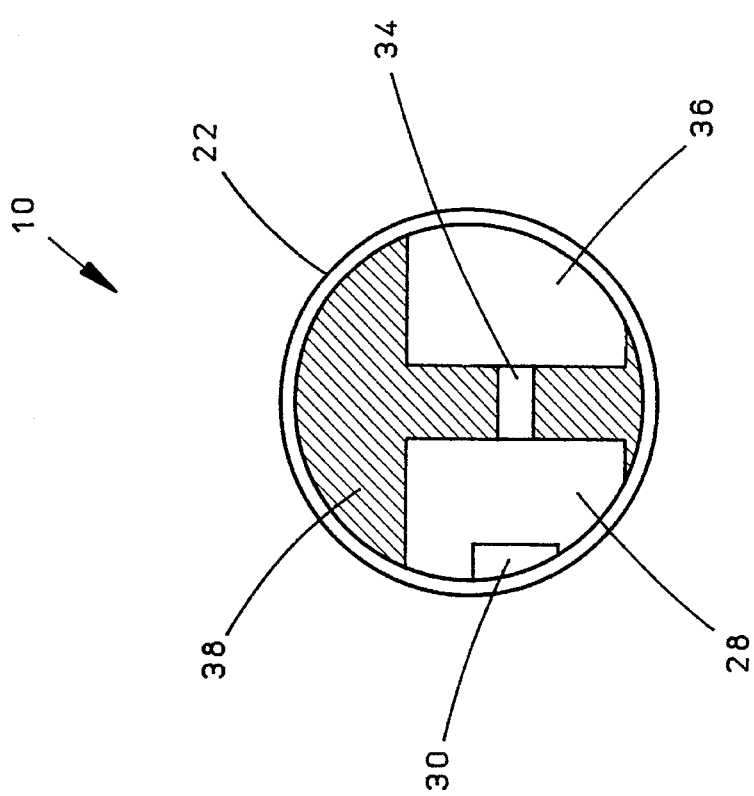
FIG. 5 is a cross sectional view of a first preferred embodiment of the invention taken along lines 5—5 shown in FIG. 3.

The flow passageway through and past resistor 10 is partially defined by channels and chambers that are cast or cut into the outer surface 22. When resistor 10 is installed, the inner surface of the installation bore forms the radially outer wall of the channels and the chambers to provide a sealed fluid passageway. As shown in FIGS. 3 and 4, an inlet channel 20 is formed in the outer surface 22 at inlet end 12. Inlet channel 20 communicates with a cylindrical entrance chamber 24 formed by a cylindrical recession in the outer surface 22. Inlet channel 20 and entrance chamber 24 are respectively oriented so that the axis of inlet channel 20 is generally tangential to the cylindrical wall of chamber 24. As a result of the tangential intersection of inlet channel 20 and inlet chamber 24, a spin is imparted upon the fluid media, upon entering spin chamber 24. A coaxial bore 26 extends from the center of the inner end wall 40 of spin chamber 24 through the body 38 of resister 10 to a deceleration chamber 32. Deceleration chamber 32 is formed by the a cylindrical recession in the outer surface 22 and as is shown in FIG. 6, with the exception of the position of the intersecting channels 20 and 30, is a mirror image of entrance spin chamber 24 across a plane normal to bore 26. A channel 30 formed in the outer surface 22 of the resister 10 allows fluid communication between the deceleration chamber 32 and a spin chamber 28 which is formed by a cylindrical recession in the outer surface 22 similar in size and adjacent to deceleration chamber 32. Deceleration chamber 32 and spin chamber 28 are connected by channel 30 in such a way that channel 30 tangentially intersects both chambers 32 and 28 on adjacent sides, in a direction conducive to spin opposite to that imparted by entrance spin chamber 24. Accordingly, viewing resister 10 from the side as in FIG. 1 the fluid media enters deceleration chamber 32 with a generally counterclockwise spin which is slowed and reversed in deceleration chamber 32 and upon exiting chamber 32 experiences a generally clockwise spin which is accelerated and maintained as a clockwise spin in spin chamber 28. Spin chamber 28 is connected by means of a second coaxial bore 34 to exit deceleration chamber 36. As is shown in FIG. 5 the overall shape and size of chambers 28 and 36 are mirror images of each other with the exception of the intersections of channel 30 with chamber 28 and of exit channel 18 with exit chamber 36 and provides the exit orifice for resister 10. It will be appreciated from FIG. 3 that exit channel 18 is also tangential to exit chamber 36 such that in order to exit the exit chamber 36, the fluid media must decelerate from clockwise spin to flow in a counterclockwise direction when viewed from the left as viewed in FIG. 3. As is further illustrated by the use of curved arrows in FIGS. 1 and 3 indicating spin direction, the direction of the fluid media's spin as induced by entrance spin chamber 24 is opposed by the spin direction required for exiting deceleration chamber 32 and the spin direction imposed by spin chamber 28 is in opposition to the spin direction required for exiting deceleration exit chamber 36. Therefore deceleration chamber 32 and exit deceleration chamber 36 both serve to decelerate and reverse the direction of the spin of the fluid media. It is understood that the induction of spin by and within the spin chambers 24 and 28 causes the fluid to make many revolutions before exiting the deceleration chambers 32 and 36 thereby using the flow passage surfaces many times, reducing cavitation by providing back pressure, and helping to prevent clogging. The spin action and the combination of acceleration and deceleration of the fluid media is understood to cause an expenditure of energy, thereby reducing velocity and effectively resisting the flow through and past resistor 10 in addition to the resistance provided by the reduction in size of the flow passageway.

Figure 9:
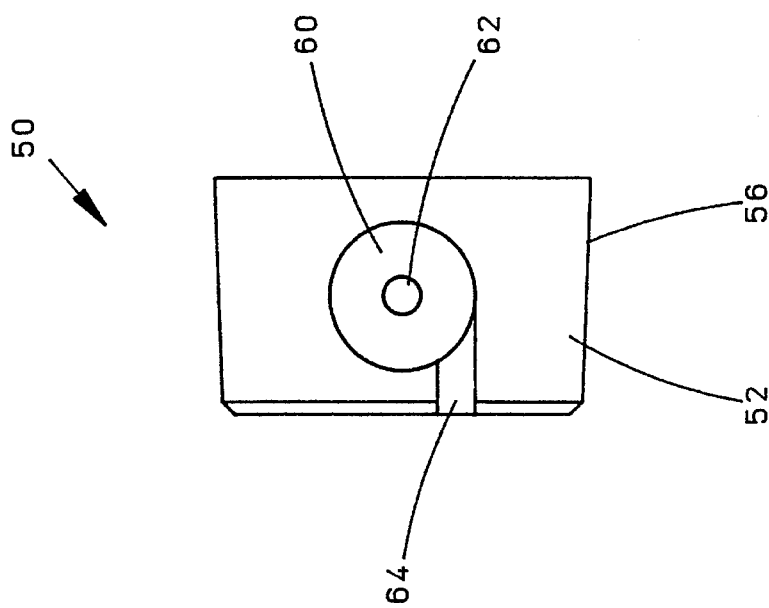
FIG. 9 is a left side view of second preferred embodiment of present invention.
Figure 8:
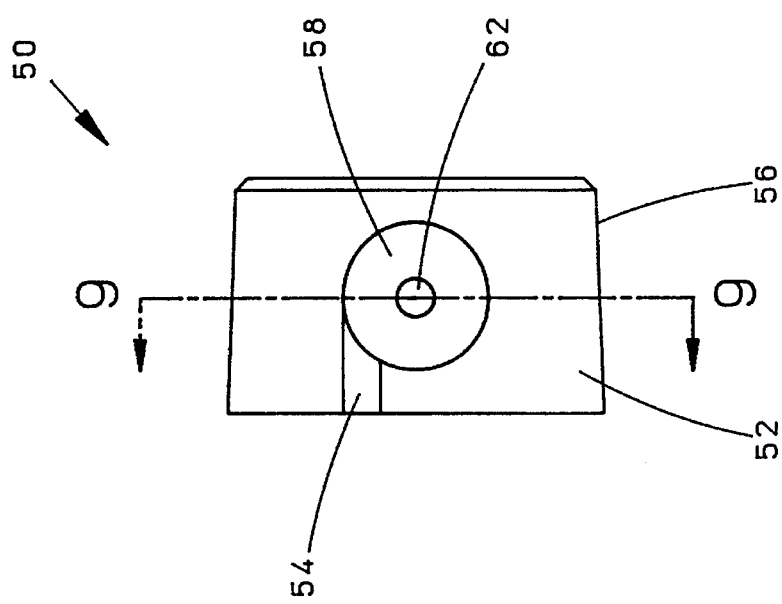
FIG. 8 is a right side view of a second preferred embodiment of the present invention.
Figure 11:
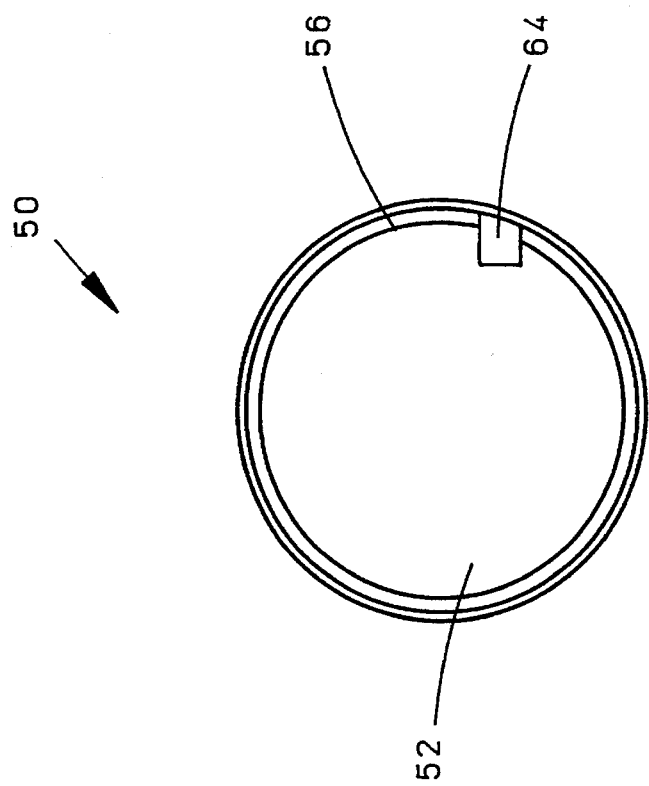
FIG. 11 is a back view of a second preferred embodiment of the invention showing the outlet end of the installed invention.
Figure 10:
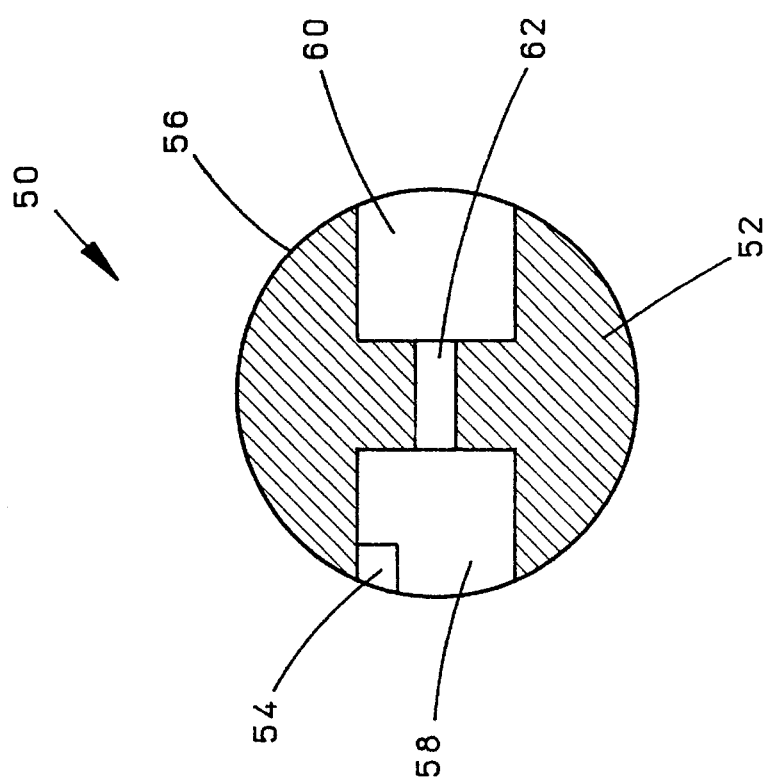
FIG. 10 is a cross sectional view of a second preferred embodiment of the present invention taken along line 10—10 shown in FIG. 7.
Figure 12:
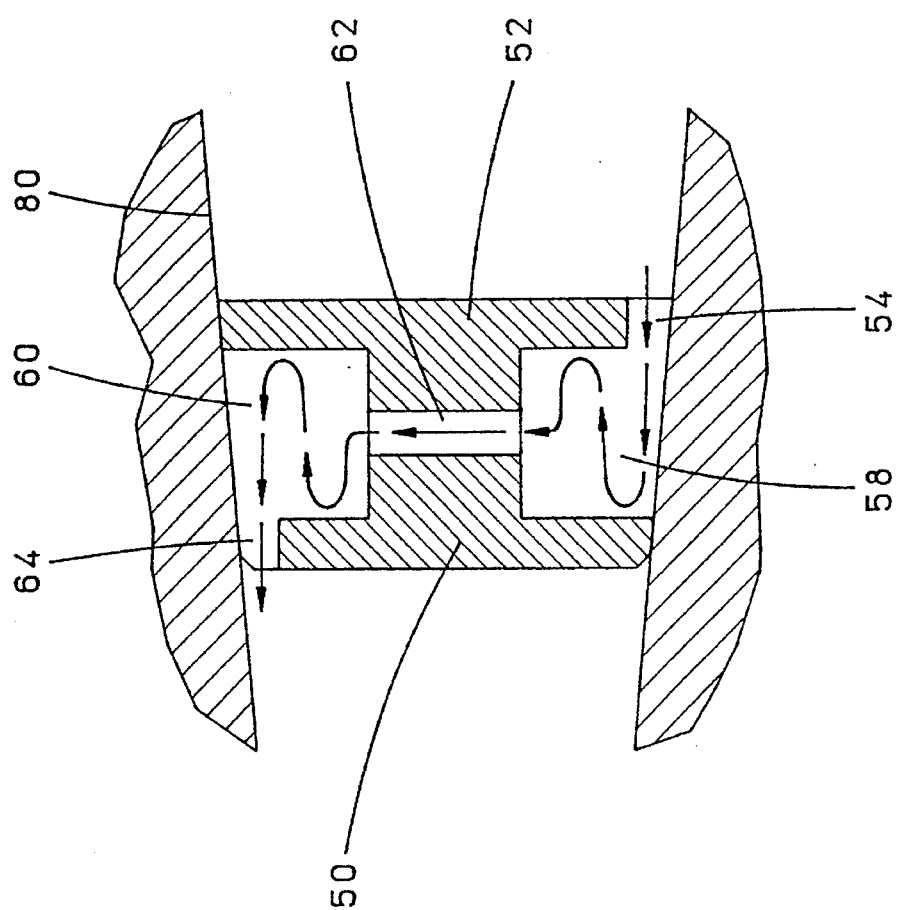
FIG. 12 is an offset sectional view of a second preferred embodiment of the present invention taken along line 12—12 shown in FIG. 9, showing the device as installed, with a flow path designated by broken arrows.

A second preferred embodiment of the present invention is designated by the numeral 50 and illustrated in FIGS. 7, 8 and 9. Resistor 50 is similar in function and overall appearance to resistor 10 exception but resistor 50 has two chambers that comprise one spin chamber and one deceleration chamber, forming one spin chamber, deceleration chamber pair. Resistor 50 therefore comprises body 52 with an inlet channel 54 formed in the outer surface 56 of body 52 communicating with an entrance spin chamber 58 of generally cylindrical shape which communicates by a bore 62 with a deceleration exit chamber 60. Bore 62 is coaxial with entrance spin chamber 58 and with deceleration exit chamber 60 and is perpendicular to the axis of resistor 50. An exit channel 64 is formed in the outer surface 56 of body 52 to provide fluid communication between deceleration exit chamber 60 and the fluid media within the installation bore on the outlet side of resistor 50. Except for the locations and direction of intersection of the inlet channel 54 with chamber 58 and of exit channel 64 with chamber 60, chambers 58 and 60 are mirror images of each other and are symmetrical about a plane through the axis of body 52 and normal to the axis of bore 62. Inlet channel 54 tangentially intersects chamber 58 to impart sin on the fluid media in the opposite direction of the spin required for exiting out of chamber 60. Thus, as viewed in FIG. 7, from the right side, a clockwise spin is imported on the fluid media by chamber 58 and the fluid media must achieve an opposite, counterclockwise (in FIG. 7) direction in order to exit through exit channel 64.

It will be anticipated that the spin chamber/deceleration chambers of resistors 10 and 50 function in pairs and other embodiments may comprise multiple spin chamber/deceleration pairs in accord with the foregoing principles. Multiple chamber pairs connected in series fashion would achieve greater flow resistance overall without decreasing the minimum bore size. Parallel arrays of flow passages in accord with the described invention are possible and suggested to provide increased flow capacity. Further it will be anticipated that other flow passage shapes may be used with embodiments retaining the tapered surface means of retention. In addition, the method of achieving a flow passage by cutting away the outer surface and using the installation bore to complete and seal a flow passage can be advantageously used in other embodiments.

Since the co-efficient of friction of materials used in the resistor body 38 or 52 are relevant considerations to the self-holding characteristics of the taper angle of resistors 10 and 50, it is anticipated that variations in the acceptable range of taper angles may occur in the event presently unanticipated materials are utilized in the manufacture of the resistors 10 and 60. Similarly, specific manufacturing methods may affect surface finish and thereby cause the range of acceptable taper angles to vary. The selection of a specific taper angle will depend upon consideration of a number of factors including the allowable force to be applied to the resistor 10 upon being driven into the installation bore, as well as the coefficient of friction of the materials used.

It should be appreciated and anticipated that while resistor 10 has been fabricated of aluminum, and a variety of materials could be used with satisfactory, but somewhat different results. It is specifically anticipated that stainless steel, plastic or composite materials may be used and the differing characteristics of such materials would be design considerations. In applications involving softer or more plastic materials, the taper angle would be considerably more important that with harder materials that would not have the same potential to deform under pressure. Generally, the resistor body 38 or 52 should be thermally compatible with each the material of the installation site to prevent the stresses or separations frequently caused by unequal expansion and contraction rates.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fluid resistor for installation into the bore of a fluid passageway comprising a body with a generally frustaconical radially outer surface, an inlet end and an outlet end that is smaller in diameter than the inlet end and a resistance flow passageway, defined at least partially by the inner wall of the bore in which the resistor is installed and partially by the outer surface of the resistor body, for resistingly allowing fluid media to flow past the fluid resistor after the installation thereof in the fluid passageway the resistance flow passageway comprising an inlet passageway formed by a channel in the radially outer surface of the resistor body at the inlet end communicating with a generally cylindrical first chamber, a second cylindrical chamber which communicates with an outlet passageway formed by a channel formed on the radially outer surface of the body at an outlet end, and a bore intermediate said chambers.

2. The fluid resistor of claim 1 wherein the chambers are formed by cylindrical cavities in the outer surface of the resistor body and the chambers and the inlet and outlet channels comprise outer walls formed by the inner wall of the installation bore upon insertion of the resistor into the installation bore and the bore between the first chamber and the second chamber is coaxial with said chambers.

3. The fluid resistor of claim 2 wherein the inlet passageway generally tangentially intersects the first chamber and the outlet passageway generally tangentially intersects the second chamber, said inlet and outlet passageways being positioned to effect a reversal of the fluid velocity vector at the exit of the second chamber.

4. The fluid resistor of claim 3 wherein the inlet passageway intersects the first chamber and the outlet passageway intersects the second chamber on opposite sides of the respective cylinders defined thereby.

5. The fluid resistor of claim 4 wherein the inside diameter of the first and second chambers is at least two but not more than three times the diameter of coaxial bore.

6. The fluid resistor of claim 5 wherein the included angle of taper of the outer surface of the resistor body is from about 3.5 to about 5.0 degrees.

7. The fluid resistor of claim 6 wherein the included angle of taper of the outer surface of the resistor body is about 4.3 degrees, 8. The fluid resistor of claim 7 wherein the coaxial bore passes through, and is normal to, the axis of the resistor body.

9. A fluid resistor for insertion into a fluid passageway comprising a frustaconical body partially defining a flow passageway for providing resistance to the passage of fluid media past the fluid resistor after the insertion of the resistor into the fluid passageway, the flow passageway comprising a plurality of serially connected means for sequentially inducing the fluid media to spin and decelerating said spin.

10. The fluid resistor of claim 9 wherein each spin induction and deceleration means comprises a pair of cylindrical chambers interconnected by a bore of smaller diameter, each chamber being tangentially intersected by a flow passage, the direction of the flow passage intersection with each chamber of each pair being opposite to the direction of flow passage intersection with the other chamber in said pair.

11. The fluid resistor of claim 10 wherein the bore is coaxial with the chambers.

12. The fluid resistor of claim 11 wherein the inside diameter of the each chamber is at least two but not more than three times the diameter of the connecting coaxial bore.

13. The fluid resistor of claim 12 wherein the included angle of taper of the outer surface of the resistor body is from about 3.5 to about 5.0 degrees.

14. The fluid resistor of claim 13 wherein the included angle of taper of the outer surface of the resistor body is about 4.3 degrees.

15. The fluid resistor of claim 14 wherein the chambers are formed by cylindrical cavities in the outer surface of the resistor body that are sealed upon insertion of the resistor into the fluid passageway.

16. The fluid resistor of claim 15 wherein the chamber intersecting flow passages are formed by channels in the outer surface of the resistor body that are sealed upon insertion of the resistor into the fluid passageway.

* * * * *